United States Patent [19]

Igawa et al.

[11] Patent Number: 4,728,556

[45] Date of Patent: Mar. 1, 1988

[54] ELECTROSTATIC RECORDING MEDIUM

[75] Inventors: Takao Igawa, Numazu; Susumu Nemoto, Susono; Mitsuru Maeda, Shizuoka; Akihiko Goto, Numazu; Taeko Maeda, Susono, all of Japan

[73] Assignee: Ricoh Company, Ltd., Tokyo, Japan

[21] Appl. No.: 892,325

[22] Filed: Aug. 4, 1986

[30] Foreign Application Priority Data

Aug. 20, 1985 [JP] Japan ................................ 60-180950
Aug. 21, 1985 [JP] Japan ................................ 60-181812

[51] Int. Cl.$^4$ .......................... B32B 5/28; B32B 27/06

[52] U.S. Cl. .................................... 427/121; 428/461; 428/511; 428/323; 503/131.5

[58] Field of Search ............... 428/323, 900, 447, 461, 428/511, 516; 427/121, 126; 346/131.5

[56] References Cited

U.S. PATENT DOCUMENTS

| | | | |
|---|---|---|---|
| 3,011,918 | 12/1961 | Silvernail et al. | 427/121 X |
| 3,607,377 | 9/1971 | Cross et al. | 427/121 X |
| 3,956,562 | 5/1976 | Shibata et al. | 427/121 X |
| 4,214,031 | 7/1980 | Miyakawa et al. | 427/121 X |
| 4,303,720 | 12/1981 | Clough | 427/121 X |
| 4,316,943 | 2/1982 | Sinkovitz et al. | 427/121 X |

FOREIGN PATENT DOCUMENTS

| | | | |
|---|---|---|---|
| 0018891 | 6/1978 | Japan | 427/121 |
| 1363563 | 8/1974 | United Kingdom | 427/121 |

OTHER PUBLICATIONS

Anschel et al, Electrographic Image Forming Materials, B. F. Goodrich, vol. 15, No. 2, 7/72.

*Primary Examiner*—Nancy A. B. Swisher
*Attorney, Agent, or Firm*—Oblon, Fisher, Spivak, McClelland & Maier

[57] ABSTRACT

An electrostatic recording medium is disclosed, which comprises a substrate, an electroconductive layer, and a recording layer which are successively overlaid on the substrate, with the surface of the recording layer being studded with at least one component selected from the group consisting of a polymeric electrolyte, an inorganic salt and a surface active agent.

12 Claims, 1 Drawing Figure

ELECTROSTATIC RECORDING MEDIUM

BACKGROUND OF THE INVENTION

The present invention relates to an electrostatic recording medium, which is especially suitable for preparing precise images by use of an electrostatic printer plotter incorporated in a computer-aided drawing apparatus (hereinafter referred to as the CAD). More particularly, the present invention relates to an electrostatic recording medium comprising a substrate, an electroconductive layer and a recording layer which are successively overlaided on the substrate, with the surface of the recording layer being studded with at least one component selected from the group consisting of a polymeric electrolyte, an inorganic salt and a surface active agent.

Recently drawing techniques using computers are rapidly developed and widely used. Under such circumstances, there is a great demand for an electrostatic recording medium for use with a printer plotter for precise image drawing by electrostatic recording, that is, for use with the CAD. This is because when image formation is carried out on a conventional electrostatic recording medium by use of the CAD, thin line images are apt to be broken, or dot images are apt to become thicker than the original dot images, or small dots are omitted due to abnormal discharge from a recording head of the CAD.

For solving such problems, for instance, the following countermeasures have been proposed, (i) adjusting the space between a recording stylus of an electrostatic recording apparatus and the electrostatic recording medium, (ii) selecting suitable materials in accordance with the necessary electrostatic capacity of the recording layer, and (iii) adjusting the electric resistivity of an electroconductive layer to a suitable value and regulating the applied voltage. These countermeasures are in fact effective for the above problems to some extent. However, the results still do not come up to the quality level required for precise image drawing.

SUMMARY OF THE INVENTION

It is therefore an object of the present invention to provide an electrostatic recording medium suitable for use with an electrostatic printer plotter incorporated in the CAD, capable of yielding precise images free from missing characters and broken lines, without causing abnormal discharging.

According to the present invention, this object is attained by an electrostatic recording medium comprising a substrate, an electroconductive layer, and a recording layer which are successively overlaid on the substrate, with the surface of the recording layer being studded with at least one component selected from the group consisting of a polymeric electrolyte, an inorganic salt and a surface active agent.

BRIEF DESCRIPTION OF THE DRAWING

In the drawing, the single FIGURE shows a schematic diagram of an example of an electrostatic recording apparatus that can be employed for preparing an electrostatic recording medium according to the present invention.

DETAILED DESCRIPTION OF THE PREFERRED EMBODIMENTS

Figure 1:
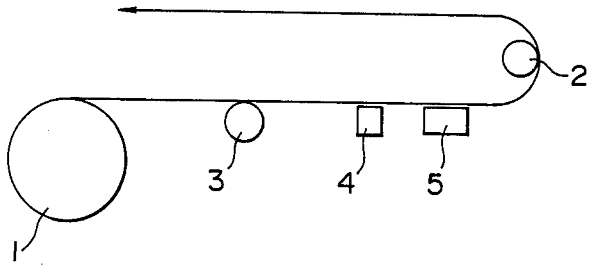

Specific examples of a polymeric electrolyte, an inorganic salt and a surface active agent with which the recording layer of the electrostatic recording medium according to the present invention are studded in the present invention are as follows:

(1) Polymeric Electrolytes (1)-1 Cationic Polymeric Electrolytes

Polyvinyl benzyl trimethylammonium chloride,
polydiaryl ammonium chloride,
polymethacryloxyethyl trimethylammonium chloride,
poly N-acrylamidepropyl-3-trimethylammonium chloride,
poly N-methylvinylpyridinium chloride,
poly N-vinyl-2,3-dimethylimidazolium chloride,
polyvinyl trimethyammonium chloride,
polyacryltrimethylammonium chloride,
polyethyleneimine chloride,
polymethacryloxyethyldimethyl sulfonium chloride, and
polymethacryloxyethyltributyl phosphonium chloride.

As commercially available cationic polymeric electrolyte, for example, Chemistat 8800, Chemistat 6300 and Chemistat 5500 made by Sanyo Chemical Industries, Ltd., and CP-280 commercially made by Calgon Corp., can be employed.

(1)-2 Anionic Polymeric Electrolytes

Sodium polyacrylate,
ammonium polymethacrylate,
ammonium polystyrenesulfonate,
sodium polyvinylsulfonate,
polystyrene sulfonic acid, and
ammonium polyvinylphosphonate.

As a commercially available anionic polymeric electrolyte, VERSA-TL 125 made by Kanebo-NSC, Ltd., can be employed.

(1)-3 Nonionic Polymeric Electrolytes

Polyethylene oxide,
polyacrylamide, and
polyvinyl pyrrolidinone.

(2) Inorganic Salts $AgNO_3$, $Al(NO_3)_3$, $NH_4NO_3$, $Ca(NO_3)_2$, $KNO_3$, $NaNO_3$, $Ba(NO_3)_2$, $LiNO_3$, $ZnCl_2$, $AlCl_3$, $NH_4Cl$, KCl, $CaCl_2$, $CeCl_3$, $CsCl_3$, $CuCl_2$, NaCl, LiCl, $MgCl_2$, $SnCl_2$, $NaClO_4$, $Ba(ClO_4)_2$, $Mg(ClO_4)_2$, $K_2CrO_4$, $P_2O_5$, KBr, NaBr, $MgBr_2$, LiBr, $(NH_4)_2CO_3$, $K_2CO_3$, $Na_2CO_3$, $KHCO_3$, $NaHCO_3$, KF, NaF, $K_2PHO_3$, $NH_4HPHO_3$, $NaSiO_3$, $KBO_2$, $NaPO_3$, KI, NaI, $Na_2S$, $K_2S$, NaHS, $Al_2(SO_4)$, $(NH_4)_2SO_4$, $ZnSO_4$, $K_2SO_4$, $Ce_2(SO_4)_3$, $Na_2SO_4$, $MgSO_4$, $K_3PO_4$, and $Na_3PO_4$.

(3) Surface Active Agents (3)-1 Cationic Surface Active Agents

Alkylamine salt, alkyltrimethylammonium halide, alkyldimethylbenzylammonium halide, alkylpyridinium halide, alkylamidemethylammonuium halide, alkyloxymethylpyridinium halide, and polyoxyethylene alkylamine.

As commercially available cationic surface active agent, for example, polyethyleneimine 210T made by Sogo Pharmaceutical Co., Ltd., can be employed.

(3)-2 Ânionic Surface Active Agents

Soaps such as potassium oleate, Turkey red oil, oleic acid, isobutyl amide, sodium salts and amine salts of higher alcohol sulfuric esters, polyethylene glycol sulfuric ester, fatty acid amide sulfuric ester, olefin sulfuric ester, alkylsulfosuccinic acid salt, alkylarylsulfonic acid salt, alkylphosphate, and alkylphosphonate.

(3)-3 Nonionic Surface Active Agents

Glycerin, polyoxyethylene alkyl ether, polyoxyethylene alkyl phenol ether, polyoxyethylene alkyl ester, polyoxyethylene alkylamine, polyoxyethylene alkylamide, sorbitan alkyl ester, and polyoxyethylene sorbitan alkyl ester.

(3)-4 Amphoteric Surface Active Agents

Salts of alkylamines and monochloroacetic acid, salts of alkylamines and sulfuric acid, salts of alkylamines and sulfonic acid, and salts of alkylamines and phosphoric ester.

The above components can be employed alone or in combination. When these components are applied to the surface of the recording layer, it is necessary that the surface of the recording layer be studded with these components. In other words, it is necessary that these components be scattered on the surface of the recording layer in a minutely discontinuous state, that is, in the form of dots over the surface of the recording layer. However, it is not necessary that each of the scattered components have a particular shape.

Representative examples of a method of performing such application of the above components in the above-mentioned manner are as follows:

(1) Applying the above components in a dry state to the recording layer by bringing the components into contact with the recording layer, followed by rubbing the components against the recording layer, so that the components are discontinuously distributed in the form of dots in the surface of the recording layer.

Specific examples of a method of doing the above are as follows:

(1)-*a* In the course of the fabrication of an electrostatic recording medium, a solution or a dispersion containing at least one of the above components is coated on a roller and the component is dried on the roller. The component-bearing roller is then brought into contact with a recording layer of the electrostatic recording medium, so that the component is transferred in a dry state from the roller to the recording layer in such a manner as to be discontinuously distributed in the form of dots in the surface of the recording layer.

(1)-*b* In the above case (1)-*a*, it is not always necessary that the component be directly applied to the roller. Instead, the component is applied to a support material such as a sheet of paper or a film and is dried to prepare a component-bearing support material. This support material is wound around the roller and is brought into contact with the recording layer as the roller is rotated, whereby the recording layer is studded with the component.

(2) Applying the above components in a semi-dry state to the recording layer by bringing the components into contact with the recording layer, so that the components are discontinuously distributed in the form of dots in the surface of the recording layer.

(2)-*a* The procedures in the above (1)-*a* and (1)-*b* are followed except that the component is applied to the recording layer as the component is slightly wetted.

(2)-*b* A dispersion containing the above component is scooped up by an application roller and the scooped component is transferred from the application roller to the recording medium as the solvent of the dispersion is appropriately evaporated. Unless the solvent is evaporated, the component cannot be discontinuously distributed in the form of dots on the recording layer.

(2)-*c* In the above procedure (2)-*b*, a transfer roller is additionally attached to the application roller, so that the component is applied to the recording medium through the transfer roller from the application roller under application of an air blast thereto from a blower.

(3) Spraying a dispersion containing the above components against the recording layer, so that the components are discontinuously distributed in the form of dots on the recording layer.

In addition to the above methods, in order to apply the above components in the form of dots to the recording layer of the recording medium, an electrostatic recording apparatus can be employed, which is provided with a member by which the above component is applied to the recording medium at a position prior to where the recording layer is contacted by a recording head of the recording apparatus.

The single accompanying FIGURE shows a schematic diagram of such an electrostatic recording apparatus. In the FIGURE, reference numeral 1 indicates an electrostatic recording medium. Reference numeral 2 indicates a drive roller by which the electrostatic recording medium 1 is transported to a development section 5 of the recording apparatus, passing over a recording head 4. Reference numeral 3 indicates an application roller for applying the above-mentioned component in the form of discontinuous dots to the recording layer of the recording medium 1 before the recording medium reaches the recording head 4.

When this electrostatic recording apparatus is used, a conventional electrostatic recording medium can be employed for the CAD because the above components can be applied in the above-mentioned manner to the recording layer of the recording medium prior to the electrostatic image formation by the recording head.

By referring to the following examples according to the present invention and comparative examples, the present invention will now be explained in detail.

EXAMPLE 1

An electroconductive member consisting of a substrate made of paper and an electroconductive layer consisting of polyvinyl benzyl trimethylammonium chloride having a thickness of 3 μm formed on the substrate was prepared. An electrostatic recording layer was then formed by coating on the electroconductive layer of the electroconductive member a dispersion consisting of the following components with a coating amount of 6 $g/m^2$ when dried, whereby an electrostatic recording medium was prepared.

| | Parts by Weight |
|---|---|
| Polyvinyl butyral resin ("S-Lec" made by Sekisui Chemical Co., Ltd.) | 50 |
| Calcium carbonate | 50 |
| Toluene | 500 |

A cationic polymeric electrolyte dispersion consisting of the following components, with the solid component concentration thereof being 5 wt. %, was coated on a polyester film by a wire bar and was then dried at 80° C. for 2 minutes, so that a cationic polymeric electrolyte bearing member was prepared with an electrolyte coating amount of 2 $g/m^2$ when dried.

| | Parts by Weight |
|---|---|
| A styrene-polyvinyl benzyl trimethyl-ammonium chloride-N—[2-(N',N',N'—trimethylammonium chloride)ethyl] N,N—dimethylvinyl benzyl ammonium chloride copolymer (33.3 wt. % Chemistat 6300 made by Sanyo Chemical Industries, Ltd.) | 50 |
| Methyl alcohol | 285 |

The thus prepared polymeric electrolyte bearing member was superimposed on the above prepared electrostatic recording medium in such a manner that the polymeric electrolyte coating side of the polymeric electrolyte bearing member came into contact with the recording layer side of the electrostatic recording medium, and the polymeric electrolyte bearing member and the recording medium were rubbed together, so that the polymeric electrolyte was transferred to the electrostatic recording medium so as to be distributed in the form of dots over the recording layer thereof.

Electrostatic printing was performed on the above processed electrostatic recording medium by a commercially available printer plotter (Drastem 8600 made by Matsushita Electric Industrial Co., Ltd.), using an original with lattice patterns (each lattice having a size of 4 cm×4 cm). As a result, clear images free from missing characters were formed on the electrostatic recording medium, with broken lines only at 3 spots and abnormal discharging only at 5 spots in 16 lattice patterns according to visual inspection.

EXAMPLE 2

A cationic polymeric electrolyte dispersion consisting of the following components was coated on a sheet of high quality paper (having a basis weight of 60 $g/m^2$) by a wire bar and was then dried at 110° C. for 3 minutes, so that a polymeric electrolyte bearing member was prepared with an electrolyte coating amount of 5 $g/m^2$ when dried.

| | Parts by Weight |
|---|---|
| Poly(N,N—dimethyl-3,5-methylene-piperidinium chloride) (30 wt. % CP-280 made by Calgon Corp.) | 50 |
| Methylcellulose | 10 |
| Clay | 10 |
| Water | 100 |

The thus prepared polymeric electrolyte bearing member was superimposed on the same electrostatic recording medium as that prepared in Example 1 and the polymeric electrolyte was transferred to the electrostatic recording medium in the same manner as in Example 1, so that the polymeric electrolyte was distributed in the form of dots over the recording layer thereof.

Electrostatic printing was performed on the above processed electrostatic recording medium by a commercially available printer plotter (Drastem 8600 made by Matsushita Electric Industrial Co., Ltd.), using the same original as that employed in Example 1. As a result, clear images free from missing characters were formed on the electrostatic recording medium, with broken lines only at 3 spots and abnormal discharging only at 6 spots in 16 lattice patterns according to visual inspection.

EXAMPLE 3

An anionic polymeric electrolyte dispersion consisting of the following components was coated on a sheet of high quality paper (having a basis weight of 60 $g/m^2$) by a wire bar and was then dried at 80° C. for 2 minutes, so that a polymeric electrolyte bearing member was prepared with an electrolyte coating amount of 4 $g/m^2$ when dried.

| | Parts by Weight |
|---|---|
| 20 wt. % sodium polystyrene sulfonate (made by Toyo Soda Mfg. Co., Ltd.) | 30 |
| Methyl alcohol | 90 |

The thus prepared polymeric electrolyte bearing member was superimposed on the same electrostatic recording medium as that prepared in Example 1 and the polymeric electrolyte was transferred to the electrostatic recording medium in the same manner as in Example 1, so that the polymeric electrolyte was distributed in the form of dots over the recording layer thereof.

Electrostatic printing was performed on the above processed electrostatic recording medium by a commercially available printer plotter (Drastem 8600 made by Matsushita Electric Industrial Co., Ltd.), using the same original as that employed in Example 1. As a result, clear images free from missing characters were formed on the electrostatic recording medium, with broken lines at 34 spots and abnormal discharging only at 9 spots in 16 lattice patterns according to visual inspection.

EXAMPLE 4

A cationic polymeric electrolyte dispersion consisting of the following components was scooped up by a scooping roller, transferred to a transfer roller, and was then subjected to air blast drying by a blower, so that the cationic polymeric electrolyte dispersion was instantly semi-dried on the transfer roller:

| | Parts by Weight |
|---|---|
| Polyvinyl benzyl trimethylammonium chloride (33.3 wt. % Chemistat 5500 made by Sanyo Chemical Industries, Ltd.) | 20 |
| Methyl alcohol | 100 |

The transfer roller which held thereon the semi-dried cationic polymeric electrolyte was brought into contact with the same electrostatic recording medium as that prepared in Example 1, so that the polymeric electrolyte was transferred to the electrostatic recording medium so as to be distributed in the form of dots over the recording layer thereof.

Electrostatic printing was performed on the above processed electrostatic recording medium by a commercially available printer plotter (Drastem 8600 made by Matsushita Electric Industrial Co., Ltd.), using the same original as that employed in Example 1. As a result, clear images free from missing characters were formed on the electrostatic recording medium with broken lines only at 2 spots and abnormal discharging only at 1 spot in 16 lattice patterns according to visual inspection.

EXAMPLE 5

An aqueous electrolyte solution consisting of the following components was coated on a sheet of high quality paper (having a basis weight of 60 $g/m^2$) by a wire bar and was then dried at 110° C. for 3 minutes, so that an electrolyte bearing member was prepared with an electrolyte coating amount of 5 $g/m^2$ when dried.

| | Parts by Weight |
|---|---|
| Sodium chloride | 20 |
| Water | 80 |

The thus prepared electrolyte bearing member was superimposed on the same electrostatic recording medium as that prepared in Example 1 and the electrolyte was transferred to the electrostatic recording medium in the same manner as in Example 1, so that the electrolyte was distributed in the form of dots over the recording layer thereof.

Electrostatic printing was performed on the above processed electrostatic recording medium by a commercially available printer plotter (Drastem 8600 made by Matsushita Electric Industrial Co., Ltd.), using the same original as that employed in Example 1. As a result, clear images free from missing characters were formed on the electrostatic recording medium, with broken lines at 20 spots and abnormal discharging only at 9 spots in 16 lattice patterns according to visual inspection.

EXAMPLE 6

A cationic surface active agent solution consisting of the following components was coated on a sheet of high quality paper (having a basis weight of 60 $g/m^2$) by a wire bar and was then dried at 110° C. for 3 minutes, so that a cationic surface active agent bearing member was prepared with a surface active agent coating amount of 2 $g/m^2$ when dried.

| | Parts by Weight |
|---|---|
| Polyethyleneimine 210T (made by Sogo Pharmaceutical Co., Ltd.) | 10 |
| Water | 90 |

The thus prepared cationic surface active agent bearing member was superimposed on the same electrostatic recording medium as that prepared in Example 1 in such a manner that the surface active agent coating side of the surface active agent bearing member came into contact with the recording layer side of the electrostatic recording medium, and the surface active agent was transferred to the electrostatic recording medium in the same manner as in Example 1, so that the surface active agent was distributed in the form of dots over the recording layer thereof.

Electrostatic printing was performed on the above processed electrostatic recording medium by a commercially available printer plotter (Drastem 8600 made by Matsushita Electric Industrial Co., Ltd.), using the same original as that employed in Example 1. As a result, clear images free from missing characters were formed on the electrostatic recording medium, with broken lines only at 3 spots and abnormal discharging only at 2 spots in 16 lattice patterns according to visual inspection.

COMPARATIVE EXAMPLE 1

Example 1 was repeated except that the polymeric electrolyte was not applied at all to the electrostatic recording medium. The result of the electrostatic recording was that the breaking of lines occurred at 206 spots and abnormal discharging occurred at 19 spots in the electrostatic recording.

COMPARATIVE EXAMPLE 2

Example 4 was repeated except that the cationic polymeric electrolyte dispersion was directly applied to the electrostatic recording medium, without subjecting the dispersion held on the transfer roller to the air blast drying, so that the cationic polymeric electrolyte was uniformly and continuously distributed over the recording layer of the electrostatic recording medium. The result of the electrostatic recording was that almost no charging took place and no images were formed.

TABLE

| | Number of Line Breaking Spots | Number of Abnormal Electric Discharge |
|---|---|---|
| Example 1 | 3 | 5 |
| Example 2 | 3 | 6 |
| Example 3 | 34 | 9 |
| Example 4 | 2 | 1 |
| Example 5 | 20 | 9 |
| Example 6 | 3 | 2 |
| Comparative Example 1 | 206 | 19 |
| Comparative Example 2 | No Images Formed | |

What is claimed is:

1. An electrostatic recording medium, comprising: a substrate, an electroconductive layer and a recording layer which are successively overlaid on said substrate, with the surface of said recording layer being studded with at least one component selected from the group consisting of a polymeric electrolyte, an inorganic salt and a surface active agent.

2. The electrostatic recording medium as recited in claim 1, wherein said polymeric electrolyte is selected from the group consisting of a cationic polymeric electrolyte, an anionic polymeric electrolyte and a nonionic polymeric electrolyte.

3. The electrostatic recording medium as recited in claim 1, wherein said inorganic salt is selected from the group consisting of:

$AgNO_3$, $Al(NO_3)_3$, $NH_4NO_3$, $Ca(NO_3)_2$, $KNO_3$, $NaNO_3$, $Ba(NO_3)_2$, $LiNO_3$, $ZnCl_2$, $AlCl_3$, $NH_4Cl$, $KCl$, $CaCl_2$, $CeCl_3$, $CsCl_3$, $CuCl_2$, $NaCl$, $LiCl$, $MgCl_2$, $SnCl_2$, $NaClO_4$, $Ba(ClO_4)_2$, $Mg(ClO_4)_2$, $K_2CrO_4$, $P_2O_5$, $KBr$, $NaBr$, $MgBr_2$, $LiBr$, $(NH_4)_2CO_3$, $K_2CO_3$, $Na_2CO_3$, $KHCO_3$, $NaHCO_3$, $KF$, $NaF$, $K_2PHO_3$, $NH_4HPHO_3$, $NaSiO_3$, $KBO_2$, $NaPO_3$, $KI$, $NaI$, $Na_2S$, $K_2S$, $NaHS$, $Al_2(SO_4)$, $(NH_4)_2SO_4$, $ZnSO_4$, $K_2SO_4$, $Ce_2(SO_4)_3$, $Na_2SO_4$, $MgSO_4$, $K_3PO_4$, and $Na_3PO_4$.

4. The electrostatic recording medium as recited in claim 1, wherein said surface active agent is selected from the group consisting of a cationic surface active agent, an anionic surface active agent, a nonionic surface active agent and an amphoteric surface active agent.

5. The electrostatic recording medium as recited in claim 2, wherein said cationic polymeric electrolyte is selected from the group consisting of:

polyvinyl benzyl trimethylammonium chloride,
polydiaryl ammonium chloride,
polymethacryloxyethyl trimethylammonium chloride,
poly N-acrylamidepropyl-3-trimethylammonium chloride,
poly N-methylvinylpyridinium chloride,
poly N-vinyl-2,3-dimethylimidazolium chloride,
polyvinyl trimethyammonium chloride,
polyacryltrimethylammonium chloride,
polyethyleneimine chloride,
polymethacryloxyethyldimethyl sulfonium chloride, and
polymethacryloxyethyltributyl phosphonium chloride.

6. The electrostatic recording medium as recited in claim 2, wherein said anionic polymeric electrolyte is selected from the group consisting of sodium polyacrylate, ammonium polymethacrylate, ammonium polystyrenesulfonate, sodium polyvinylsulfonate, polystyrene sulfonic acid, and ammonium polyvinylphosphonate.

7. The electrostatic recording medium as recited in claim 2, wherein said nonionic polymeric electrolyte is selected from the group consisting of polyethylene oxide, polyacrylamide, and polyvinyl pyrrolidinone.

8. The electrostatic recording medium as recited in claim 4, wherein said cationic surface active agent is selected from the group consisting of alkylamine salt, alkyltrimethylammonium halide, alkyldimethylbenzylammonium halide, alkylpyridinium halide, alkylamidemethylammonuium halide, alkyloxymethylpyridinium halide, and polyoxyethylene alkylamine.

9. The electrostatic recording medium as recited in claim 4, wherein said anionic surface active agent is selected from the group consisting of potassium oleate, Turkey red oil, oleic acid, isobutyl amide, sodium salts and amine salts of higher alcohol sulfuric esters, polyethylene glycol sulfuric ester, fatty acid amide sulfuric ester, olefin sulfuric ester, alkylsulfosuccinic acid salt, alkylarylsulfonic acid salt, alkylphosphate, and alkylphosphonate.

10. The electrostatic recording medium as recited in claim 4, wherein said nonionic surface active agent is selected from the group consisting of glycerin, polyoxyethylene alkyl ether, polyoxyethylene alkyl phenol ether, polyoxyethylene alkyl ester, polyoxyethylene alkylamine, polyoxyethylene alkylamide, sorbitan alkyl ester, and polyoxyethylene sorbitan alkyl ester.

11. The electrostatic recording medium as recited in claim 4, wherein said amphoteric surface active agent is selected from the group consisting of salts of alkylamines and monochloroacetic acid, salts of alkylamines and sulfuric acid, salts of alkylamines and sulfonic acid, and salts of alkylamines and phosphoric ester.

12. An electrostatic recording medium, comprising:

a substrate, and an electroconductive layer and a recording layer which are successively overlaid on said substrate, with the surface of said recording layer, having scattered thereon in a minutely discontinuous state, at least one component selected from the group consisting of a polymeric electrolyte, an inorganic salt and a surface active agent.

* * * * *